(12) United States Patent
Jin et al.

(10) Patent No.: US 7,863,389 B2
(45) Date of Patent: Jan. 4, 2011

(54) RUBBER COMPOSITION

(75) Inventors: Yongcheng Jin, Hiratsuka (JP); Wonmun Choi, Hiratsuka (JP)

(73) Assignee: The Yokohama Rubber, Tokyo (JP)

( * ) Notice: Subject to any disclaimer, the term of this patent is extended or adjusted under 35 U.S.C. 154(b) by 0 days.

(21) Appl. No.: 12/438,423

(22) PCT Filed: Aug. 8, 2007

(86) PCT No.: PCT/JP2007/065879

§ 371 (c)(1),
(2), (4) Date: Feb. 23, 2009

(87) PCT Pub. No.: WO2008/023616

PCT Pub. Date: Feb. 28, 2008

(65) Prior Publication Data

US 2010/0130688 A1 May 27, 2010

(30) Foreign Application Priority Data

Aug. 23, 2006 (JP) .............................. 2006-226859

(51) Int. Cl.
*C08F 36/02* (2006.01)
*C08F 8/34* (2006.01)
(52) U.S. Cl. ................. 525/331.9; 525/351; 525/333.1; 525/333.2
(58) Field of Classification Search ................. 525/351, 525/331.9, 331.1, 333.2
See application file for complete search history.

(56) References Cited

U.S. PATENT DOCUMENTS

2002/0107338 A1* 8/2002 Wonmun et al. ............ 525/535
2006/0094831 A1* 5/2006 Choi et al. ................ 525/331.9
2010/0004380 A1* 1/2010 Choi .......................... 524/570

FOREIGN PATENT DOCUMENTS

| CA | 2317296 | * | 3/2001 |
| JP | 2001-089440 | | 4/2001 |
| WO | WO-2005-035647 | | 4/2005 |

* cited by examiner

*Primary Examiner*—Ling-Siu Choi
(74) *Attorney, Agent, or Firm*—Connolly Bove Lodge & Hutz LLP

(57) ABSTRACT

A rubber composition having an excellent adhesion with a brass-plated wire and an excellent heat aging resistance of a vulcanite containing (A) 100 parts by weight of a diene-based rubber, (B) 0.1 to 10 parts by weight of, as a vulcanization accelerator, an amine salt compound of a carboxylic acid group-containing disulfide having the formula (I):

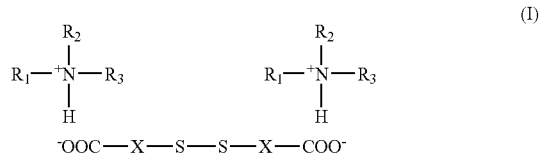

and (C) 0.1 to 10 parts by weight of, as a vulcanization agent, a cyclic sulfide compound having the formula (V):

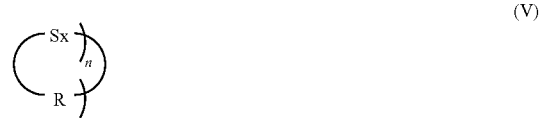

wherein R is a substituted or unsubstituted $C_2$-$C_{20}$ alkylene group, a substituted or unsubstituted $C_2$-$C_{20}$ oxyalkylene group or an aromatic ring-containing alkylene group, x is an integer of 2-6 on average and n is an integer of 1-30.

4 Claims, No Drawings

RUBBER COMPOSITION

CROSS REFERENCE TO RELATED APPLICATIONS

This application is a national phase of PCT/JP2007/065879, filed on Aug. 8, 2007, which claims priority to JP 2006-226859, filed on Aug. 23, 2006, the entire contents of which are incorporated herein by reference in their entireties.

TECHNICAL FIELD

The present invention relates to a rubber composition for a tire, more particularly relates to a rubber composition having an excellent adhesion property with, for example, a brass-plated wire used for the tire belt part of pneumatic tires and an excellent heat aging resistance of the vulcanized rubber.

BACKGROUND ART

In rubber compositions adhering with a wire used for belt parts of a pneumatic tire, particularly a brass-plated wire, attempts have been made to mix DZ (i.e., N,N-dicyclohexyl-2-benzothiazolylsulfenamide), which is an accelerator having a slow vulcanization speed, and a large amount of sulfur to improve the adhesion property with the wire (e.g., see Ishikawa, Yasuhiro: *Journal of the Japan Rubber Society*, 65, 86 (1992)). Furthermore, as a vulcanization agent capable of supplementing the heat aging resistance of the rubber vulcanizate adhered with the brass-plated wire, an organic cyclic sulfide may be mentioned, but the adhesion property thereof was not satisfactory.

DISCLOSURE OF THE INVENTION

Accordingly, the object of the present invention is to provide a rubber composition having an excellent adhesion property with a wire used at a belt part of a pneumatic tire and, furthermore, having an excellent heat aging resistance of the vulcanized rubber.

In accordance with the present invention, there is provided a rubber composition comprising:

(A) 100 parts by weight of a diene-based rubber (B) 0.1 to 10 parts by weight of, as a vulcanization accelerator, an amine salt compound of a carboxylic acid group-containing disulfide having the formula (I):

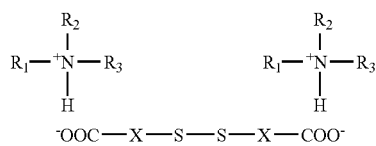

(I)

wherein $R_1$, $R_2$ and $R_3$ independently represent hydrogen or a $C_1$ to $C_{20}$ hetero atom and/or an organic group, which may be substituted with a substitution group, and X is a $C_2$ to $C_{20}$ hetero atom and/or an organic group, which may be substituted with a substitution group, and (C) 0.1 to 10 parts by weight of, as a vulcanization agent of a cyclic sulfide compound having the formula (V):

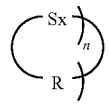

(V)

According to the present invention, by using a vulcanization accelerator comprising an amine salt compound of a carboxylic acid group-containing disulfide (I) and a vulcanization agent containing a cyclic sulfide compound (V), a rubber composition having an excellent adhesion property with a brass-plated wire and an excellent heat aging resistance of the vulcanizate is obtained.

BEST MODE FOR CARRYING OUT THE INVENTION

The singular form terms (e.g., "a", "an", and "the") used in the Description and the Claims include the plural form in coverage so long as not clear otherwise from the context.

The inventors engaged in research to solve this problem and, as a result, succeeded in improving the adhesion property with a brass-plated wire and the heat aging resistance of the vulcanizate by using, in the rubber, as a vulcanization aid, a vulcanization accelerator including an amine salt compound of a carboxylic acid group-containing disulfide (I) and using, as a vulcanization agent, a cyclic sulfide compound (V).

As the rubber component usable for the rubber composition of the present invention, for example, it is possible to use any rubber capable of compounding into a rubber composition for a tire. Specifically, diene-based rubbers such as natural rubber (NR), polyisoprene rubber (IR), butadiene rubber (BR), chloroprene rubber (CR), styrene-butadiene copolymer rubber (SBR), ethylene-propylene-diene copolymer rubber (EPM, EPDM), acrylonitrile-butadiene copolymer rubber (NBR) etc. may be mentioned.

According to the present invention, as the vulcanization accelerator, the amine salt compound of a carboxylic acid group-containing disulfide having the formula (I) is included in an amount, based upon 100 parts by weight of rubber, of 0.1 to 10 parts by weight, preferably 0.3 to 5 parts by weight. Further, it is also possible to jointly use any vulcanization accelerator other than the amine salt compound of a carboxylic acid group-containing disulfide (I). The amount of use in the case of using another vulcanization accelerator is not particularly limited, but it is preferable to balance the cost, the good heat aging resistance of the vulcanizate and the improvement of the adhesion property. If the amount of the amine salt compound of the carboxylic acid group-containing disulfide (I) is too small, the adhesion property of the brass-plated wire and rubber becomes unpreferably insufficient, while if too large, the rubber becomes unpreferably too hard and the elongation at break becomes unpreferably insufficient.

The amine salt compound of the carboxylic acid group-containing disulfide usable in the present invention (i.e., an amine salt of disulfide of the present invention) is a compound having the formula (I). Details are as described in the specification of, for example, Japanese Patent Application No. 2007-204681 filed on Aug. 6, 2007 (i.e., an application claiming a domestic priority of 2006-22158 filed on Aug. 14, 2006) (the content of this application being incorporated in this description by reference). Specifically, in the above formula (I), $R_1$, $R_2$ and $R_3$ may be, independently, hydrogen or a $C_1$ to $C_{20}$, preferably $C_1$ to $C_{12}$, organic group, as such an organic group, for example, a methyl group, ethyl group, propyl group, butyl group, hexyl group, stearyl group, or other chain hydrocarbon group, a cyclopropyl group, cyclobutyl group, cyclohexyl group, or other cyclic hydrocarbon group may be mentioned. These organic groups may also contain, in their molecular chains, a nitrogen atom, oxygen atom, sulfur atom, or other hetero atom. As examples of such an organic group, for example, a methoxypropyl group, methoxyethyl group, and tetrahydrofurfuryl group may be mentioned. $R_1$ and $R_2$ may, together with the nitrogen atoms they bond with, form heterocyclic groups, for example, imidazole groups, triazole groups, pyrazole groups, aziridine groups, pyrrolidine groups, piperidine groups, morpholine groups, thiomorpholine groups, or other groups. When the $R_1$ and $R_2$ form heterocyclic groups together with the nitrogen atoms they bond with, they may also have substituent groups on the heterocycles. As examples of this substituent group, for example, a methyl, ethyl, or another alkyl group; bromo, chloro, or other halogen group; alkoxy group, carboxyl group, ester group, etc. may be mentioned.

In formula (I), X is an organic group selected from a substitutable $C_2$ to $C_{20}$, preferably $C_2$ to $C_{12}$, chain hydrocarbon group or alicyclic hydrocarbon group, aromatic hydrocarbon group, and heterocyclic group. As examples of this organic group, for example, a methylene group, ethylene group, propylene group, hexylene group, cyclobutylene group, cyclohexylene group, phenylene group, thiazole group, thiadiazole group, pyridilene group, naphthalene group, etc. may be mentioned. When X is a chain hydrocarbon group or alicyclic hydrocarbon group, X may have in that carbon chain a hetero atom selected from the group consisting of nitrogen atom, oxygen atom and sulfur atom and may also have a methyl, ethyl or other alkyl group, bromo, chloro, or other halogen group, carboxyl group, ester group, etc.

The amine salt compound of disulfide (I) according to the present invention may be produced by a reaction, as shown in the following reaction formula (1), between a disulfide compound having a carboxylic acid in the molecule thereof as shown in the formula (II), wherein X is as defined above, and an amine of formula (III), wherein $R_1$, $R_2$ and $R_3$ are as defined above. This reaction does not require an oxidant, catalyst, etc. Production is possible by mixing and reacting compounds having the formula (II) and the formula (III) in a suitable solvent (e.g., methanol, ethanol, propanol or another aliphatic alcohol, diethyl ether, tetrahydrofuran or other ether, acetone, 2-butanone or other ketone or other organic solvent.

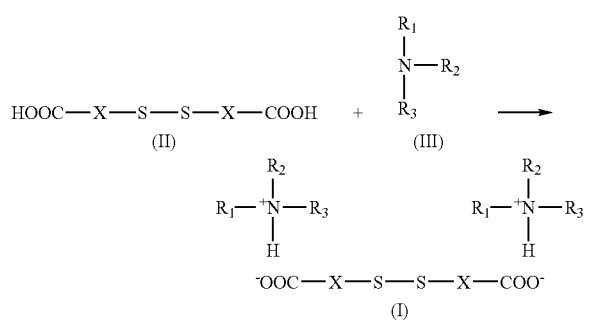

Reaction Formula (1)

According to another aspect of the present invention, the amine salt compound of disulfide (I) may be produced by a reaction, such as the following reaction formula (2), between a thiol compound (IV) having a carboxylic acid group in the molecule thereof and amine (III) in the presence of an oxidant:

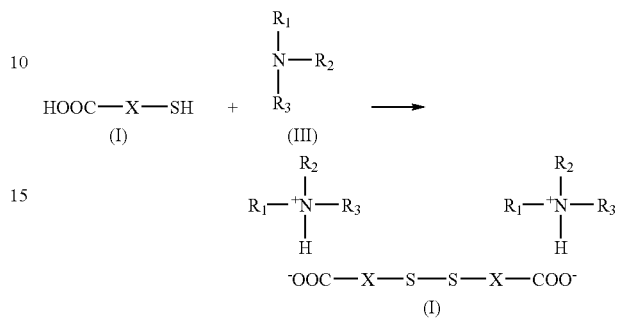

Reaction Formula (2)

In the reaction formulas (1) and (2), the amine (III) is preferably reacted in a stoichiometric excess (e.g., 1.01 to 1.15 equivalents) based upon the carboxylic acid groups of the disulfide compound (II) or thiol compound (IV).

In the reaction formula (1), as specific examples of the carboxylic acid-containing disulfide compound (II) usable as the starting material, for example, dithiodiglycolic acid, dithiodipropionic acid, dithiosalicylic acid, dithiobis(2-nitrobenzoic acid), etc. may be mentioned. On the other hand; as the thiol compound having the formula (IV) used in the reaction formula (2); mercaptoacetic acid, 2-mercaptopropionic acid, 3-mercaptopropionic acid, thiosalicylic acid, thionicotinic acid, etc. may be mentioned.

On the other hand, as specific examples of the amine shown by the above formula (III), for example methylamine, ethylamine, propylamine, butylamine, hexyl amine, isobutylamine, tert-butylamine, dimethylamine, diethylamine, dipropylamine, diisopropylamine, cyclopropylamine, cyclobutylamine, cyclohexylamine, N-methylcyclohexylamine, N-ethylcyclohexylamine, dicyclohexylamine, 2-methylcyclohexylamine, exo-2-aminonorbornane, 2-methoxyethylamine, bis(2-methoxyethyl)amine, tetrafurylamine, morpholine, thiomorpholine, 1-methylpiperadine, 2-methylimidazole, piperadine, trimethylamine, triethylamine, tripropylamine, etc. may be mentioned.

The oxidant usable in the reaction formula (2) is not particularly limited, but the following compounds may be mentioned. Sodium chlorate, potassium chlorate, ammonium chlorate and other chlorates; sodium perchlorate, potassium perchlorate and other perchlorates; lithium peroxide, sodium peroxide, potassium peroxide and other inorganic peroxides; sodium chlorite, potassium chlorite and other chlorites; sodium bromate, potassium bromate and other bromates; sodium nitrate, potassium nitrate, ammonium nitrate and other nitrates; sodium iodate, potassium iodate, calcium iodate and other iodates; potassium permanganate, sodium permanganate and other permanganates; sodium bichromate, potassium bichromate and other bichromates; sodium periodate and other periodates; metaperiodic acid and other periodic acids; chromic anhydride (chrome trioxide) and other chromates; lead dioxide and other lead oxides; diiodine pentaoxide and other iodine oxides; sodium nitrite, potassium nitrite and other nitrites; calcium hypochlorite and other hypochlorites; trichlorinated isocyanuric acid and other chlorinated isocyanuric acids; ammonium peroxydisulfate and other peroxydisulfates; ammonium peroxyborate and other peroxyborates; perchloric acid; hydrogen peroxide; nitric acid; chlorine fluoride, bromine trifluoride, bromine pentafluoride, iodine pentafluoride, iodine and other halogenated compounds; copper ethylene diamine tetraacetate, copper nitrilotripropionate and other water soluble chelate compounds of copper; dimethylsulfoxide and other organic compounds; oxygen, etc. When using oxygen as an oxidant, it is also possible to use air as a source of oxygen. These may be used alone or may be used in combination of several types. Among these, from the viewpoint of the ease of reaction and high efficiency, sodium chlorate, chlorate perchlorate, sodium peroxide, sodium chlorite, hydrogen peroxide, iodine, copper ethylenediamine tetraacetate, copper nitrotripropionate, and oxygen are preferable.

As the solvent usable for the reaction, methanol, ethanol, propanol, isopropanol, butanol and other aliphatic alcohols, diethyl ether, tetrahydrofuran (THF), isopropyl ether and other ethers, acetone, 2-butanone, and other ketones, acetonitrile, dimethylformamide (DMF) and other nitrogen-containing organic solvents etc. may be mentioned. These solvents may be used alone or in any mixtures thereof. Among these, from the viewpoint of high solubility with disulfides, thiols and amines and ease of removal from the reaction product, aliphatic alcohols, ethers and ketones are preferable.

The reaction temperature of the reaction is not particularly limited, but a range of 0° C. to 100° C. is preferable. If less than 0° C., the reaction time is liable to become too long, while at a temperature over 100° C., undesirable side reactions of the product are liable to occur. This reaction temperature is more preferably a range of 20° C. to 70° C.

The vulcanization accelerator usable in the rubber composition of the present invention, as explained above, may be comprised of only the amine salt compound of a carboxylic acid group-containing disulfide (I) or may jointly use, in addition to the amine salt compound of a carboxylic acid group-containing disulfide, any vulcanization accelerator generally used as a vulcanization accelerator of unvulcanized rubber in this technical field. The amine salt compound of a carboxylic acid group-containing disulfide (I) of the present invention may include general rubber vulcanization compounding agents so long as they do not adversely affect the vulcanization and/or vulcanization acceleration action of the amine salt compound of a carboxylic acid group-containing disulfide and the desired adhesion effect and improvement of the heat aging resistance can be achieved.

As the vulcanization accelerator capable of optionally being compounded into the rubber composition according to the present invention, specifically inclusion of a sulfenamide-based vulcanization accelerator is preferable. By using the sulfenamide-based or thiuram-based vulcanization accelerator, it is possible to further accelerate the vulcanization of the rubber ingredient and, also to further improve the properties of the vulcanized rubber thus obtained. As the sulfenamide-based vulcanization accelerator, for example N-cyclohexyl-2-benzothiazolyl sulfenamide, N-t-butyl-2-benzothiazolyl sulfenamide, N-oxydiethylene-2-benzothiazolyl sulfenamide, N,N'-dicyclohexyl-2-benzothiazolyl sulfenamide may be mentioned. As the thiuram-based vulcanization accelerator, for example tetrakis(2-ethylhexyl)thiuram disulfide, tetramethylthiuram disulfide, tetraethylthiuram disulfide, tetramethylthiuram monosulfide, tetrabenzylthiuram disulfide and dipentamethylenethiuram tetrasulfide may be mentioned.

The cyclic sulfide compound (V) used as a vulcanization agent in the rubber composition of the present invention is compounded in an amount, based upon 100 parts by weight of rubber, of 0.1 to 10 parts by weight, preferably 0.5 to 10 parts by weight. If the amount is too small, there is no effect on the heat aging resistance of the vulcanizate, so this is not preferable, while conversely if too large, the hardness and other vulcanized physical properties are not exhibited, so this is not preferred. In the rubber composition of the present invention, as another vulcanization agent, conventionally a conventional vulcanization agent generally used for a rubber composition (e.g., sulfur) may be used.

The cyclic sulfide compound having the formula (V) used in the present invention is a compound disclosed in our previously proposed Japanese Patent Publication (A) No. 2002-293783 (laid open on Oct. 9, 2002). The details are as described in the publication, the content of which is incorporated into this description by incorporation.

Specifically, the cyclic sulfide compound of the formula (V) can be produced by reaction of a dihalogen compound having the following formula (VI) and a metal polysulfide having the following formula (VII):

$$X\text{—}R\text{—}X \quad (VI)$$

wherein X is a halogen and R is a $C_2$ to $C_{24}$ alkylene group or an oxyalkylene group or $C_8$ to $C_{24}$ aromatic alkylene group which may have a substituent group or may contain hetero atom.

$$M\text{-}Sx\text{-}M \quad (VII)$$

wherein M is a metal of Group IA of the Periodic Table of Elements and x is an integer of 2 to 6 on average. More specifically, a dihalogen compound having the formula (VI), wherein X is a halogen, particularly preferably a chlorine atom or bromine atom, R is a $C_2$ to $C_{24}$ alkylene group which may have a substituent group or may contain hetero atom or a substituted or unsubstituted $C_2$ to $C_{24}$ oxyalkylene group or $C_8$ to $C_{24}$ aromatic alkylene group and a metal polysulfide (VII), wherein M is, for example, sodium, potassium, lithium or another metal of the Group IA etc., and x is an integer of 2 to 6, on average, preferably 3 to 6 may, for example, be reacted in a two phase system in incompatible mixed solvents of hydrophilic and lipophilic solvents to obtain a linear or cyclic polysulfide compound. The cyclic polysulfide compound is shown by the formula (V), wherein R is as defined above, x is an integer of 2 to 6 on average and n is an integer of 1 to 30.

The hydrophilic solvent and lipophilic solvent usable in the reaction are not particularly limited. It is possible to use any solvents which are not soluble with each other and form two phases in an actual reaction system. Specifically, for example, as the hydrophilic solvent, in addition to water, methanol, ethanol, ethyleneglycol, diethyleneglycol and other alcohols may be mentioned. These may also be used as any mixtures. Further, as the lipophilic solvent, toluene, xylene, benzene and other aromatic hydrocarbons, pentane, hexane and other aliphatic hydrocarbons, dioxane, dibutyl ether and other ethers, ethyl acetate and other esters etc. may be mentioned. These may be used in any mixtures thereof.

The rubber composition according to the present invention may contain, in addition to the above components, a filler other than carbon black or silica, a vulcanization or cross-linking agent, various types of oils, an antioxidant, a plasticizer and various other types of additives generally included for rubber composition. These additives may be mixed using a general use rubber kneader, for example, rolls, Banbury mixer, kneader, etc. by a general method to obtain a composition for use for vulcanization or cross-linking. The amounts of these additives may be in any conventional general amounts so long as not running counter to the object of the present invention.

Examples

Examples will be used to further explain the present invention, but the scope of the present invention is by no means limited to these Examples.

Preparation Example 1-1

Synthesis of Amine Salt Compound A of Disulfide

To 1000 g of methanol, 306.4 g (1 mol) of dithiosalicyclic acid, and 218.2 g (2.2 mol) of cyclohexyl amine were added and the mixture was reacted at room temperature for 30 minutes. After the end of the reaction, the methanol was removed under a reduced pressure, then the resultant reaction mixture was filtered and washed and dried twice with acetone to obtain 499.2 g (yield 99%) of a white powder compound A shown by the following formula.

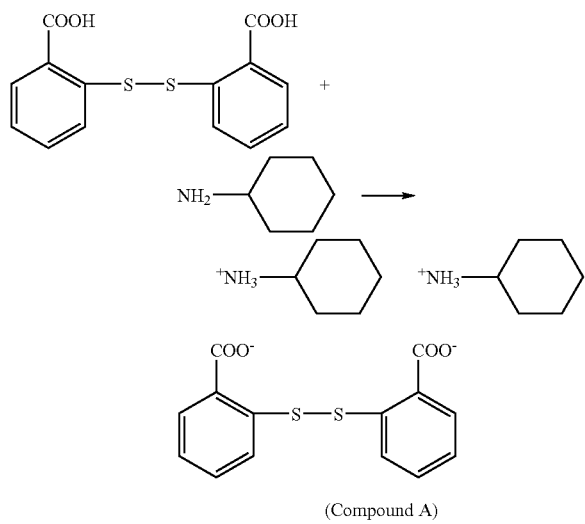

(Compound A)

$^1$HNMR (400 MHz, DMSO-d6) δ in ppm: 1.0-1.3, 1.5, 1.7, 1.9, 2.9, 7.1, 7.2, 7.5, 7.8

Elemental analysis value (%): $C_{26}H_{36}N_2O_4S_2$
Calculated: C, 61.87; H, 7.19; N, 5.55; S, 12.71
Found: C, 61.54; H, 7.28; N, 5.56; S, 12.72

Preparation Example 1-2

Synthesis of Amine Salt Compound B of Disulfide 210.3 g (1 mol) of 3,3'-dithiodipropionic acid and 218.2 g (2.2 mol) of cyclohexyl amine were reacted in 1000 g of methanol at room temperature for 30 minutes. After the end of the reaction, the methanol was removed under a reduced pressure, then the resultant reaction mixture was filtered and washed and dried twice with acetone to obtain 400.4 g (yield 98%) of a white powder compound B shown by the following formula.

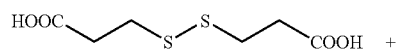

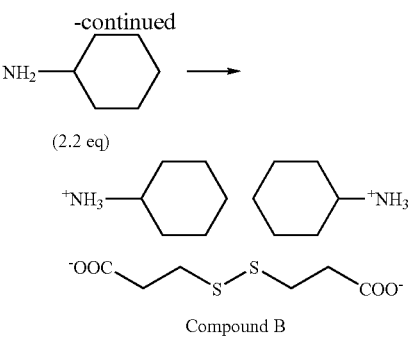

Compound B $^1$HNMR (400 MHz, DMSO-d6) δ in ppm: 1.1-1.2, 1.5, 1.7, 1.9, 2.3, 2.8, 2.9

Elemental analysis value (%): $C_{18}H_{36}N_2O_4S_2$
Calculated: C, 52.91; H, 8.88; N, 6.86; S, 15.69
Found: C, 52.83; H, 9.03; N, 6.84; S, 15.92

Preparation Example 2

Synthesis of Cyclic Polysulfide (VIII)

89.8 g (0.15 mol) of a 30 wt % sodium tetrasulfide aqueous solution was diluted with 100 g of water, then 25.9 g (0.15 mol) of 1,2-bis(2-chloroethoxy)methane was dropwise added thereto at 90° C. over 2 hours and the resultant reaction mixture was allowed to react at that temperature for a further 3 hours. After the reaction was completed, the aqueous insoluble part thereof was rinsed, then dried in vacuo at 100° C. over 2 hours to obtain 33.2 g (yield 96%) of a cyclic polysulfide having the formula (V) wherein R=—$CH_2CH_2OCH_2OCH_2CH_2$—, x (average)=4 and n=1 to 5. The cyclic polysulfide thus obtained has a number average molecular weight of 600. The NMR data was as follows:

$^1$H-NMR (dichloroform) δ: 2.9 to 3.3 (4H, $CH_2S$), 3.7 to 4.0 (4H, $CH_2O$), 4.8 (2H, $OCH_2O$).

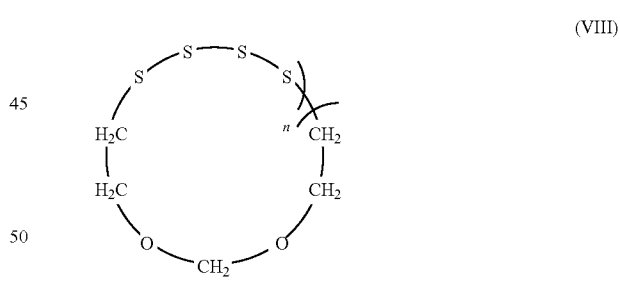

(VIII)

Examples 1 to 2 and Comparative Examples 1 to 2

Preparation of Samples

In each of the formulations shown in Table I, the ingredients other than the vulcanization accelerator, sulfur, amine salt of carboxylic acid group-containing disulfide and cyclic sulfide were mixed by a 1.7 liter closed mixer for 4 minutes and discharged when reaching 140° C. to obtain a master batch. To this master batch, the vulcanization accelerator, sulfur, amine salt of a carboxylic acid group-containing disulfide according to the present invention and cyclic sulfide were mixed by an open roll to obtain a rubber composition.

Next, the rubber composition, obtained above was vulcanized in a 15×15×0.2 cm mold at 148° C. for 45 minutes to prepare a vulcanized rubber sheet. The test methods shown below were used to determine the physical properties of the vulcanized rubber. The results are shown in Table I.

Methods for Evaluating and Testing Rubber Physical Properties

Tensile properties: According to JIS 6251, a sample of a No. 3 dumbbell shape was elongated at a speed of 500 mm/min to determine the strength at break ($T_B$) and elongation at break ($E_B$) at the time of 100% elongation at 20° C. and the 100% modulus ($M_{100}$) before and after the aging (80° C.×96 hours). A smaller $M_{100}$ change indicates a superior heat aging resistance.

Wire adhesion property: According to ASTM (D1871), test pieces of brass-plated wire and unvulcanized rubber were made up and subjected to a pull-out test to obtain the pull-out force (N) and the rubber adhesion rate (%). The larger the pull-out force and the rubber adhesion rate in values, the better the adhesion property of rubber and wire shown.

A test piece after aging by humidity and heat (70° C., humidity 96%, 2 weeks) was used for a pull-out test and the pull-out force (N) and the rubber coverage (%) were used to evaluate the adhesion property of the rubber and wire. According to the present invention, by combined use of the amine salt compound of a carboxylic acid group-containing disulfide and the cyclic sulfide, the adhesion property of the rubber and wire is improved and the heat aging resistance of the rubber vulcanizate is improved.

TABLE I

|  | Comp. Ex. 1 | Comp. Ex. 2 | Comp. Ex. 3 | Ex. 1 | Ex. 2 | Ex. 3 | Ex. 4 |
| --- | --- | --- | --- | --- | --- | --- | --- |
| Formulation (parts by weight) | | | | | | | |
| Natural rubber[1] | 100 | 100 | 100 | 100 | 100 | 80 | 100 |
| SBR[2] | — | — | — | — | — | 20 | — |
| Carbon black[3] | 59 | 59 | 59 | 59 | 59 | 59 | 59 |
| Zinc oxide[4] | 9 | 9 | 9 | 9 | 9 | 9 | 9 |
| Stearic acid[5] | 0.5 | 0.5 | 0.5 | 0.5 | 0.5 | 0.5 | 0.5 |
| Antioxidant[6] | 1 | 1 | 1 | 1 | 1 | 1 | 1 |
| Organic acid cobalt (as Co)[7] | 0.2 | 0.2 | 0.2 | 0.2 | 0.2 | 0.2 | 0.2 |
| Sulfur[8] | 6.5 | 3.5 | 6.5 | 3.5 | 3.5 | 3.5 | 3.5 |
| Cyclic sulfide[9] | — | 3.5 | — | 3.5 | 3.5 | 3.5 | 3.5 |
| Amine salt A[10] | — | — | 1.5 | 1.5 | 0.7 | 1.5 | — |
| Amine salt B[11] | — | — | — | — | — | — | 1.5 |
| Vulcanization accelerator DZ[12] | 0.5 | 0.5 | — | — | — | — | — |
| Vulcanization accelerator NS[13] | — | — | — | — | 0.26 | — | — |
| Tensile properties | | | | | | | |
| $T_B$ (MPa) | 22 | 21.9 | 22.7 | 23.3 | 23.3 | 21.7 | 20.7 |
| $E_B$ (%) | 390 | 389 | 385 | 407 | 421 | 387 | 371 |
| M100 before aging (MPa) | 4.8 | 4.8 | 4.7 | 4.7 | 4.6 | 4.8 | 5.0 |
| M100 after aging (MPa) | 7.3 | 6.9 | 7 | 6.3 | 6.5 | 6.4 | 6.7 |
| $N_{100}$ change (%) | 52.1 | 43.8 | 48.9 | 34.0 | 41.3 | 33.3 | 34.0 |
| Wire adhesion property (before aging) | | | | | | | |
| Pull-out force (N) | 957 | 878 | 970 | 921 | 1016 | 925 | 915 |
| Rubber coverage (%) | 85 | 75 | 85 | 84 | 86 | 84 | 83 |
| Wire adhesion property (after humid hot aging) | | | | | | | |
| Pull-out force (N) | 680 | 587 | 750 | 740 | 747 | 725 | 710 |
| Rubber adhesion (%) | 77 | 62 | 81 | 80 | 83 | 81 | 80 |

Notes of Table I
[1]RSS#3
[2]SBR made by Nippon Zeon: Nipol 1712
[3]Seast 30 made by Tokai Carbon
[4]Ginrei R made by Toho Zinc
[5]Beads Stearic Acid YR made by NOF Corporation
[6]SANTOFLEX 6PPD made by FLEXSYS
[7]Manobond C225 made by Rhodia
[8]Crystex HS OT 20 made by Akzo Nobel
[9]Cyclic polysulfide compound of the present invention (compound having formula (VIII) synthesized in above preparation example)
[10]Amine salt compound of carboxylic acid group-containing disulfide of the present invention (amine salt compound A of carboxylic acid group-containing disulfide synthesized in above Preparation Example 1-1)
[11]Amine salt compound of carboxylic acid group-containing disulfide of the present invention (amine salt compound B of carboxylic acid group-containing disulfide synthesized in above Preparation Example 1-2)
[12]Noccelar DZ-G (N,N-dicyclohexyl-2-benzothiazolylsulfenamide) (made by Ouchi Shinko Chemical Industrial)
[13]Noccelar NS-P (N-tert-butyl-2-benzothiazylsulfenamide) (made by Ouchi Shinko Chemical Industrial)

INDUSTRIAL APPLICABILITY

According to the present invention, as explained above, by using a vulcanization accelerator containing an amine salt compound (I) of a carboxylic acid group-containing disulfide and a vulcanization agent containing a cyclic polysulfide (V), a rubber having an excellent in the adhesion property with brass-plated wire and having an excellent heat aging resistance of the vulcanizate can be obtained, and, therefore, this is useful as a belt cord rubber of a pneumatic tire.

The invention claimed is:

1. A rubber composition comprising:
   (A) 100 parts by weight of a diene-based rubber
   (B) 0.1 to 10 parts by weight of, as a vulcanization accelerator, an amine salt compound of a carboxylic acid group-containing disulfide having the formula (I):

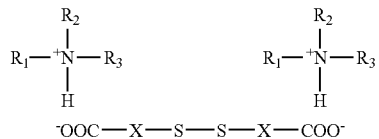

(I)

wherein $R_1$, $R_2$ and $R_3$ independently represent hydrogen or a hetero atom containing $C_1$ to $C_{20}$ organic group, which may be substituted with a substitution group, and X is a hetero atom containing $C_1$ to $C_{20}$ organic group, which may be substituted with a substitution group, and (C) 0.1 to 10 parts by weight of, as a vulcanization agent, of a cyclic sulfide compound having the formula (V):

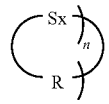

(V)

wherein R is a substituted or unsubstituted $C_2$-$C_{20}$ alkylene group, a substituted or unsubstituted $C_2$-$C_{20}$ oxyalkylene group or an aromatic ring-containing alkylene group, x is an integer of 2-6 on average, and n is an integer of 1-30.

2. A rubber composition according to claim 1, wherein the rubber composition further comprises another vulcanization accelerator.

3. A pneumatic tire using, as a belt cord rubber, the rubber composition according to claim 1.

4. A pneumatic tire using, as a belt cord rubber, the rubber composition according to claim 2.

* * * * *